Jan. 15, 1963 H. C. HANSEN 3,073,603

MECHANISMS FOR SUPPORTING AND RELEASING RECORDS HAVING OVERSIZE CENTER HOLES

Filed Sept. 22, 1959 5 Sheets-Sheet 1

Inventor:
HANS CHRISTIAN HANSEN
By Dicke, Craig & Freudenberg
ATTORNEYS

Jnventor:
HANS CHRISTIAN HANSEN
By Dicke, Craig & Freudenberg
ATTORNEYS

Jan. 15, 1963  H. C. HANSEN  3,073,603
MECHANISMS FOR SUPPORTING AND RELEASING RECORDS
HAVING OVERSIZE CENTER HOLES
Filed Sept. 22, 1959  5 Sheets-Sheet 2

Inventor:
ATTORNEYS

Jnventor:
HANS CHRISTIAN HANSEN
By Dicke, Craig & Freudenberg
ATTORNEYS

Fig. 5
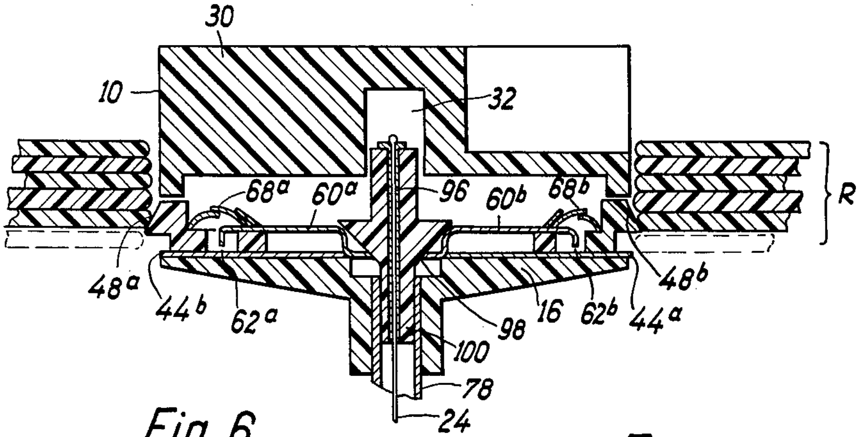
Fig. 6
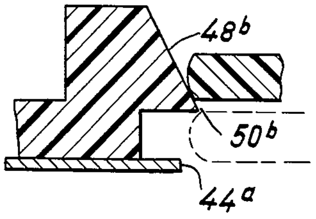
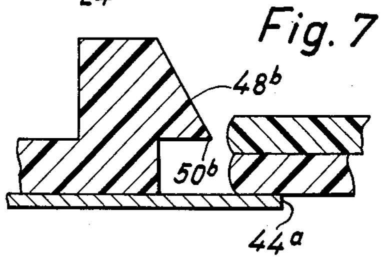
Fig. 7
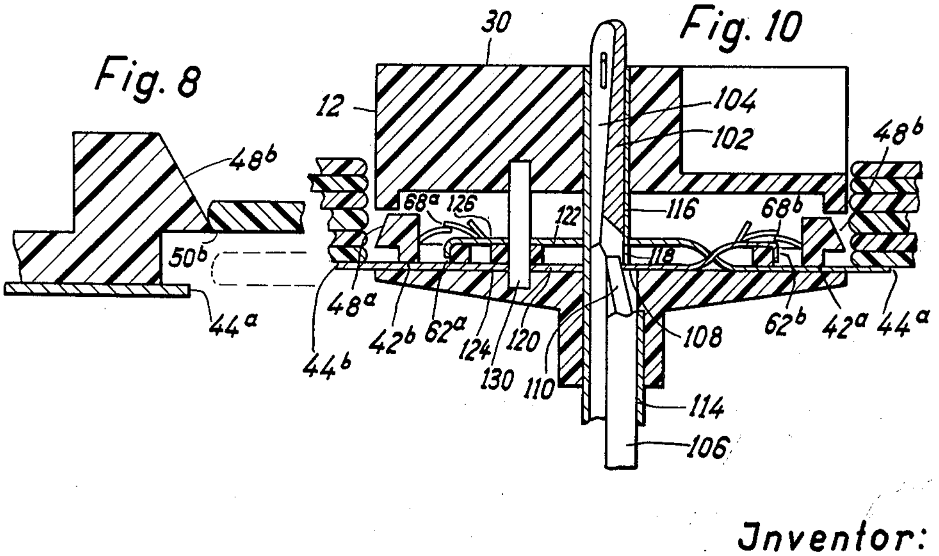
Fig. 8, Fig. 10
Inventor:
HANS CHRISTIAN HANSEN
By Dicke, Craig & Freudenberg
ATTORNEYS Jan. 15, 1963 H. C. HANSEN 3,073,603

MECHANISMS FOR SUPPORTING AND RELEASING RECORDS HAVING OVERSIZE CENTER HOLES

Filed Sept. 22, 1959

5 Sheets-Sheet 5

Inventor:
HANS CHRISTIAN HANSEN
By Dicke, Craig & Freudenberg
ATTORNEYS 3,073,603

MECHANISMS FOR SUPPORTING AND RELEASING RECORDS HAVING OVERSIZE CENTER HOLES

Hans Christian Hansen, Copenhagen, Denmark
(Christiansholmsvej 14, Klampenborg, Denmark)
Filed Sept. 22, 1959, Ser. No. 841,594
Claims priority, application Great Britain Sept. 22, 1958
29 Claims. (Cl. 274—10)

The present invention relates to a mechanism for supporting and releasing in sequence records having oversize center holes.

It is a purpose of the invention to provide a mechanism of this type which is reliable in operation.

It is a further object of the invention to provide a mechanism of the type specified which is able to operate with records of varying thicknesses within a predetermined range.

Still a further object of the invention is to provide a mechanism of the type referred to which can be operated by the drop control mechanism of a center spindle for records having small center holes.

Figure 1:
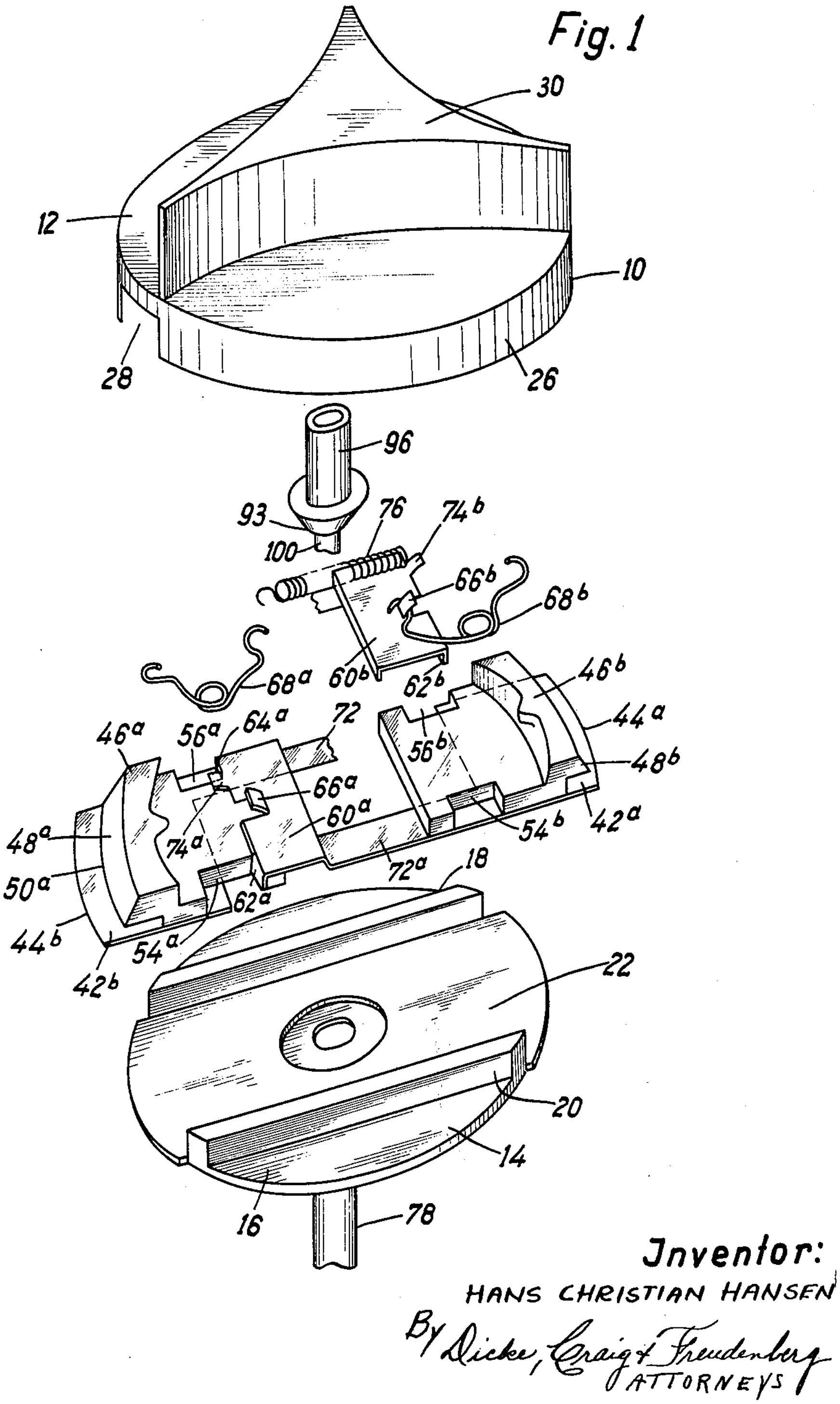
Figures 2, 3:
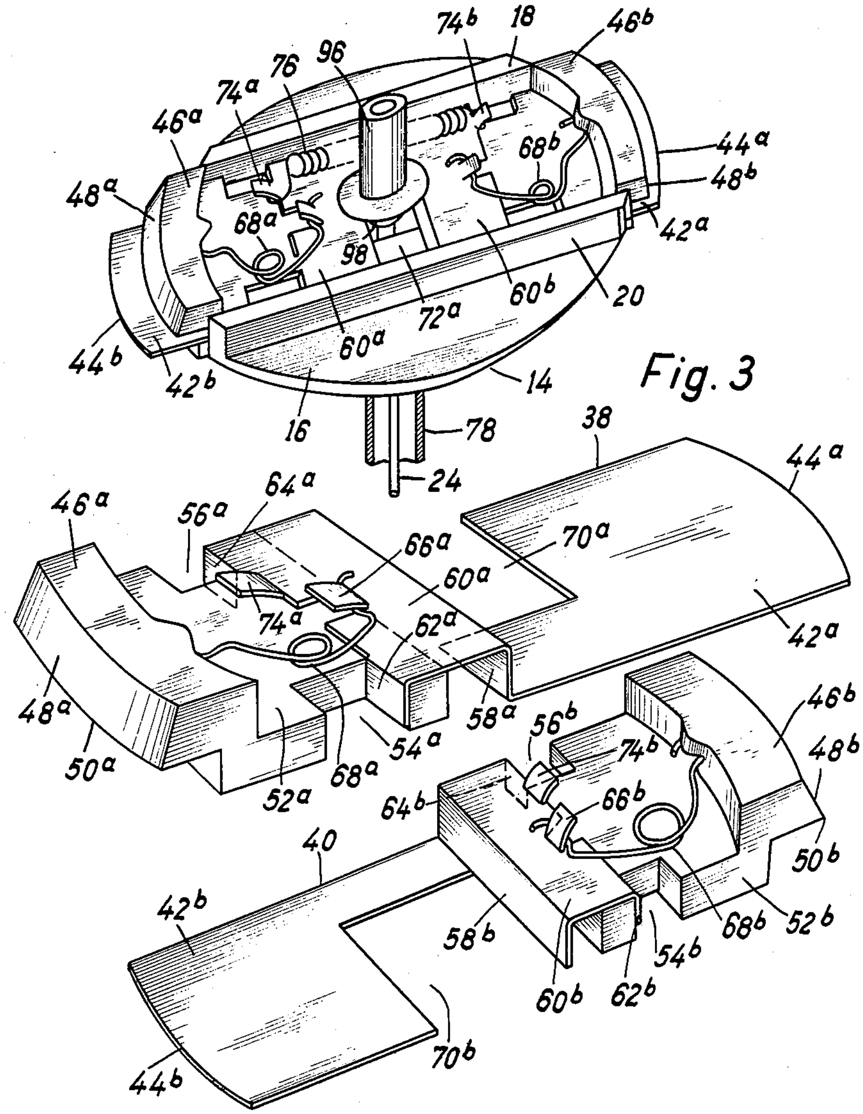
Figure 4:
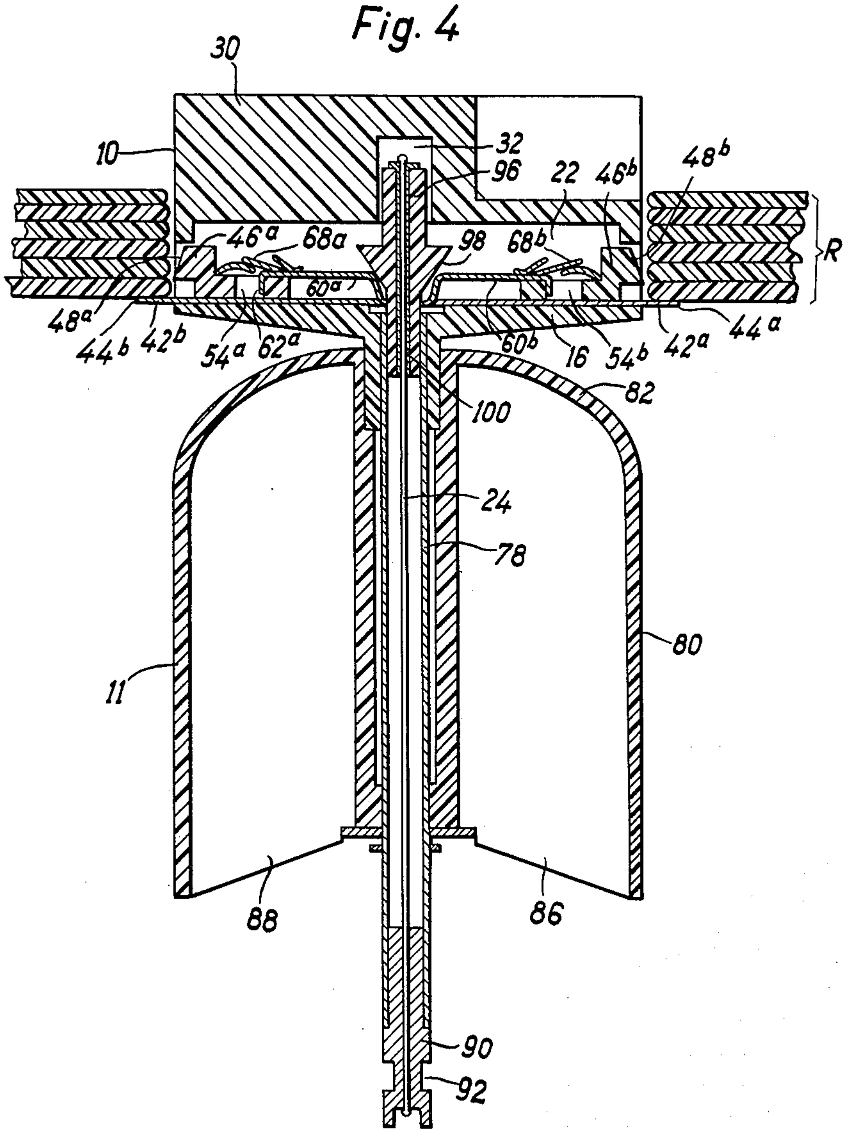
Figure 9:
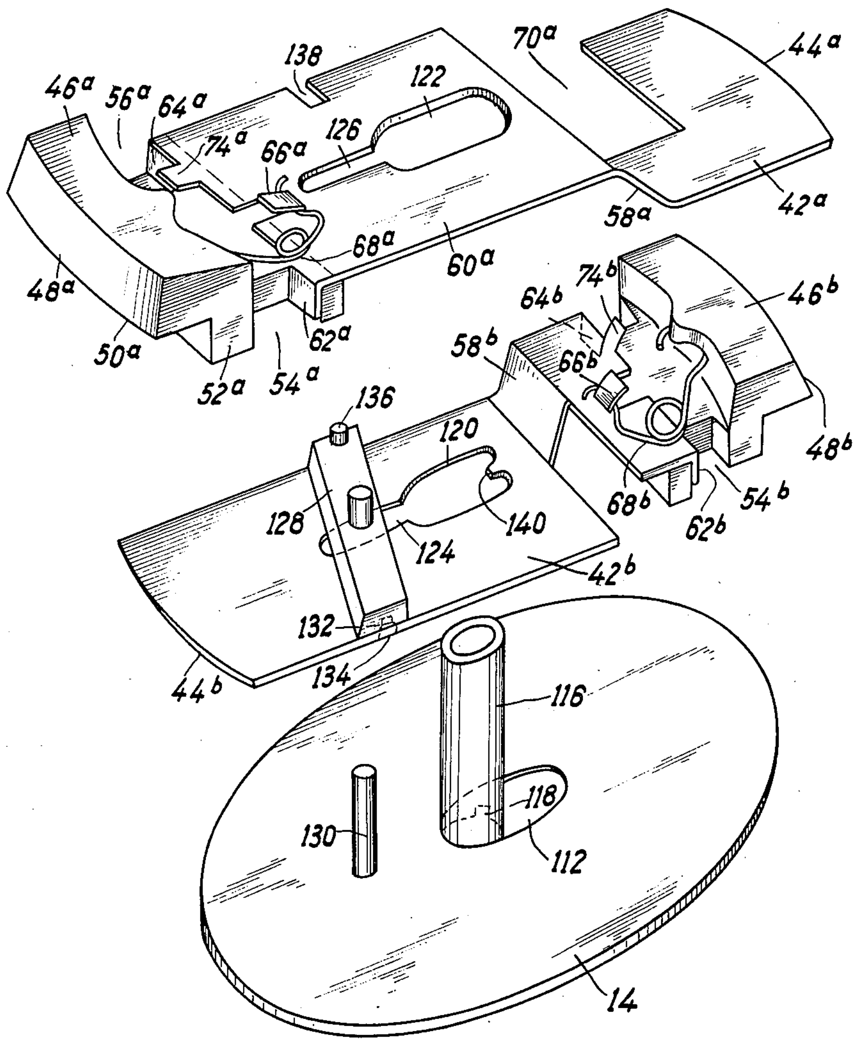

Further objects and advantages of the invention will appear from the following specification in connection with the accompanying drawing, in which FIGURE 1 is an exploded view of the top portion of a center spindle structure according to the invention, FIGURE 2 is a perspective view of an assembly of the movable parts shown in FIGURE 1, FIGURE 3 is an enlarged exploded perspective view of some of the parts shown in FIGURES 1 and 2, FIGURE 4 is a longitudinal section through a complete center spindle showing the parts in position for supporting a stack of records, FIGURE 5 is a section through the top part of the spindle shown in FIGURE 4 showing the parts in position holding the next lowermost record of a stack and releasing the lowest record, FIGURE 6 is an enlarged section through the ends of the record supporting members in the position shown in FIGURE 5, illustrating the operation in the case of a record having a thickness substantially corresponding to the maximum thickness which can be released by the spindle, FIGURE 7 is a corresponding enlarged section showing the parts in the same position as in FIGURE 4 with the primary supporting members supporting two records of a thickness substantially being the thinnest size of records to be handled, FIGURE 8 is a corresponding section as that shown in FIGURE 7 showing the operation by release of the lowest record of the two records shown in FIGURE 7, FIGURE 9 is a perspective exploded view of the movable parts of the spindle in an embodiment thereof designed as an adaptor for being controlled by means of the record release mechanism of a center spindle of thinner diameter, and FIGURE 10 is a vertical section through the top part of a spindle with the parts designed as illustrated in FIGURE 9 in operative position on the top part of a conventional spindle of small diameter.

With reference to the drawings I provide in broad terms a mechanism for supporting and releasing records having oversize center holes comprising a spindle structure 10 including primary supporting members 42*a* and 42*b* having upwardly facing record supporting surfaces whereby a stack of records having oversize center holes can be centered on the spindle structure 10 and supported on the top surfaces of the members 42*a* and 42*b*.

The spindle structure further includes secondary supporting members 46*a* and 46*b* having inclined outwardly facing surfaces 48*a* and 48*b*. Means are provided operable to move said primary supporting members and said secondary supporting members in opposite directions to retract the primary supporting members to within the confines of the spindle structure for releasing the lowest record of the stack. Simultaneously the secondary supporting members are protruded outside the confines of the spindle structure to engage their inclined exterior surfaces 48*a* and 48*b* with the center hole of the next lowermost record in the stack.

By such engagement further outward movement of the secondary supporting members is obstructed. Resilient members such as springs 68*a* and 68*b* are interposed between the primary supporting members and the secondary supporting members capable of yielding when the outward movement of the secondary supporting members is obstructed.

Hereby the springs 68*a* and 68*b* are tensioned whereby an outwardly directed pressure is exerted on the secondary supporting members. Due to the inclination of their outwardly facing surfaces this will cause an upwardly directed force to be transmitted to the next lowest record whereby the record is safely supported and depending on the weight of the overlying stack may be even slightly lifted.

In more specific terms I provide a mechanism of the type specified comprising a body 12 (FIGURE 1) operable to center a stack R of records (FIGURE 4).

In the body means are provided for supporting a pair of elongated members, preferably plate members, 42*a* and 42*b*. The exterior ends of said members define upwardly facing surfaces at substantially the same level. Each member 42*a* and 42*b* further has a portion 60*a* and 60*b* overlying the other member. The members are mounted for reciprocation between an operative record supporting position in which the end portions project outside the confines of the body 12 and a record release position in which the ends 44*a* and 44*b* are retracted to within the confines of the body 12. Adjacent the opposite end of each of the members 42*a* and 42*b* remote from their projecting ends 44*a* and 44*b* secondary supporting members 46*a* and 46*b* are provided. Each secondary supporting member 46*a* and 46*b* overlies or overlaps with a portion of the primary supporting member supported on the top side thereof. The secondary supporting members are connected with each one of the primary supporting members, more specifically with the overlying portions 60*a* and 60*b* thereof so as to define with each of the primary supporting members a structure which reciprocates as a unity. Each of the secondary supporting members 46*a* and 46*b* has as mentioned hereinbefore an inclined outwardly facing surface 48*a* and 48*b* respectively which extends vertically from a predetermined plane above the upwardly facing surface of each of the primary members 42*a* and 42*b*. The springs 68*a* and 68*b* are interposed between the secondary supporting members and the primary supporting members to allow relative longitudinal movement between said parts in each of said unitary structures so that when during reciprocation of each structure and retraction of the end edges 44*a* and 44*b* of the primary supporting members the inclined surfaces 48*a* and 48*b* of the secondary supporting members engage with the center hole of the next lowest record the springs 68*a* and 68*b* will yield and allow the necessary further reciprocation of the primary supporting members to complete their retraction and simultaneously the tensioning of the springs will cause a safe holding of the next lowest record of the stack.

By such yielding the spring will be tensioned and press the inclined surfaces 48*a* and 48*b* outwardly into engagement with the center hole of the next lowest record.

Due to the inclination of the surfaces 48*a* and 48*b* an upwardly directed force will be transmitted to the next lowest record with the result that it will be slightly lifted and thereby safely held in position on the spindle structure.

The centre spindle shown in the drawing comprises a top portion generally designated by reference numeral 10 and a lower portion generally designated by reference numeral 11 as shown in FIGURE 4. The top portion 10 comprises a removable cap 12 and a body portion generally designated by reference numeral 14 (FIGURES 1, 2, and 4).

The body portion 14 comprises a circular base plate 16 having a pair of parallel upwardly extending ribs 18 and 20 defining therebetween a channel or guide for a pair of upper and lower supporting members interlinked for concurrent operation in response to movement of an interior control member 24.

The top cap 12 is as will be apparent from FIGURES 1 and 4 provided with a downwardly extending flange 26 having a pair of oppositely located notches, of which only one notch 28 is shown in FIGURE 1. The top of the cap 12 is in the form of a spider-like member 30 having an interior bore 32, see FIGURE 4, for receiving the top end of the interior control mechanism. The design of the top end of the spindle as illustrated in FIGURE 1 provides for easy depositing of a stack of records having oversize centre holes on the spindle by gripping the records with one finger in the centre holes and another finger at the edges, the spider 30 providing passage for the finger gripping in the centre holes. Hereby the records can be handled without the risk of greasing the record surfaces provided with the playing grooves. The top cap 12 is secured to the circular base plate 16 by means of screws or the like (not shown) extending up through screw holes 34 and 36 in the base plate 16.

The exterior diameter of the top cap 12 and the lower portion 11 of the spindle is slightly less than the diameter of the oversize holes in the records to be handled.

Two elongated record supporting and releasing structures 38 and 40 (FIGURE 3) are arranged in the guide channel 22 and positioned one on the top of the other. The length of each structure is slightly greater than the diameter of the spindle.

More specifically with reference to the supporting structure 38, as shown in FIGURE 3, each supporting structure comprises a slide plate 42*a* the end 44*a* of which is arcuately formed in general conformity with the curvature of the spindle so that the curved end 44*a* normally protrudes slightly beyond the confines of the spindle body.

The other end of the structure 38 comprises a body 46*a* having an outwardly and upwardly extending inclined surface 48*a* also being arcuately formed in general conformity with the curvature of the spindle and having its lower edge 50*a* vertically spaced from the top surface of the plate 42*a* a distance corresponding substantially to the maximum thickness of a record to be handled on the centre spindle.

The member 46*a* is connected with the plate member 42*a* for reciprocation therewith when the plate member 42*a* is caused to reciprocate in the guide channel 22, but the connection is so designed that the member 46*a* is capable of yielding relatively to the plate member 42*a* during the reciprocation.

More specifically the member 46*a* has a body portion 52*a* from opposite sides of which extend notches 54*a* and 56*a*.

At a distance from the curved edge 44*a* of the plate member 42*a* which is slightly larger than half of the structure 42*a*, 46*a*, the plate member 42*a* has an upwardly bent portion 58*a* which continues in a horizontal portion 60*a* parallel with the plate portion but spaced vertically therefrom a distance substantially corresponding to the thickness of the body portion 52*a* of the member 46*a*. At each end of the portion 60*a* the plate portion has a downwardly extending flap 62*a*, 64*a* respectively which engages in each of the slots 54*a* and 56*a*. Adjacent that end of the plate portion 60*a* which faces the member 46*a* the plate portion is provided with an upwardly extending flap 66*a* which is engaged by one end of a wire spring 68*a*, the other end of which engages in a hole in that surface of the member 46*a* which faces the plate structure so as to hold the parts 42*a* and 46*a* in such mutual relationship that the flaps 62*a* and 64*a* are in engagement with the right hand sides of the notches 54*a* and 56*a*. It will be understood, however, that when the structure 38 is reciprocated in the left hand direction an obstruction against movement caused by engagement between the inclined surface 48*a* and the centre hole of a record will cause the wire spring 68*a* to yield and thereby allow further movements of the plate member 42*a* with the flaps 62*a* and 64*a* moving in the notches 54*a* and 56*a*.

The plate member 42*a* further has a slot or notch 70*a* extending from one side thereof so that the plate member 42*a* is connected with the part 58*a* by means of a relatively narrow strip 72*a* only the width of which is less than half the width of the structure, i.e. half the width of the channel or guide 22.

The other structure 40 is as clearly shown in the exploded view, FIGURE 3, complementary to the structure 38 just described and parts of the structure 40 are referred to by the same reference numerals as corresponding parts of the structure 38 with index "*b*."

The two structures are mounted on each other in the manner apparent from FIGURES 1 and 2 with the under surface of the member 52*a* in engagement with the top surface of the plate member 42*b* and with the underside of the member 52*b* in engagement with top side of the plate member 42*a*. The plate members are further provided with flaps 74*a* and 74*b* between which a spring 76 is interposed so as to interlink the two structures for concurrent operation in opposite direction.

The base plate 16 has as shown in FIGURE 4 a downwardly extending tubular portion 17 formed integral therewith. A tubular member 78 is secured to the base plate structure 16, 17. The base plate structure 16, 17 may, for example, be moulded of a suitable synthetic resinous material to which the tubular member 78 is secured in the mould. The lower portion 11 of the spindle structure comprises an exterior shell 80 having a dome shaped top portion 82 and an interior portion 84 connected to the exterior shell 80 by means of a plurality of radially extending ribs 86, 88 so as to form a hollow light-weight structure capable of rotating on the tubular member 78.

The centre spindle structure is placed on a phonograph with the lower end of the tubular member 78 extending down through the hollow centre spindle of the phonograph turntable (not shown). At the lower end of the tubular member 78 a slidable plug 90 is provided having an annular groove 92 for engagement with the drop control mechanism of the phonograph in a manner not described in detail but known to those skilled in the art. By way of example the phonograph structure may be designed according to my copending U.K. patent application No. 700/56, corresponding to United States patent application Ser. No. 633,288.

An elongated control member 24 extends through the hollow tubular member 78 and is at its lower end connected with the slidable plug 90, the top end extending through and connected to a slidable member 96 having a conical portion 98 engaging with the structures 38 and 40 and having a cylindrical portion 100 extending down therethrough guided in the top end of the tube 78.

When the parts described are assembled they assume the position shown in FIGURES 2 and 4. The spring 76 keeps the two structures in engagement with the narrow lower end of the conical member 98 and in this position the arcuate edges 44a and 44b of the plate members 42a and 42b extend outside the confines of the center spindle body whereby the outwardly facing exterior ends of the base members are defining record supporting surfaces capable of supporting a stack of records R as shown in FIGURE 4. In this position the outwardly facing inclined surfaces 48a and 48b are substantially in alignment with the confines of the spindle structure or slightly inside the surface thereof, also as shown in FIGURE 4.

When for the purpose of releasing the lowest record of the stack R to the turntable the drop control mechanism causes the interior control member 24 to be pulled down, the engagement between the conical member 98 and the top edges of the vertical portions 58a and 58b of the plate members will result, with reference to FIGURE 4, in such actuation of the parts that the plate structure 38 is moved in the left hand direction while the plate structure 40 is moved in the right hand direction thereof. This will cause a retraction of the edges 44a and 44b to a position in alignment with or within the confines of the spindle, and simultaneously bring the members 46a and 46b to a protruding position which will result in engagement of the inclined surfaces 48a and 48b with the interior hole of the next lowest record in the stack as shown in FIGURE 5. When the centre hole of the next lowest record is engaged by the outwardly facing inclined surfaces 48a and 48b this will result in support of the next lowest record and simultaneously prevent further outward movement of the member 46a and 46b. Due to the springs 68a and 68b the retraction of the plate members 42a and 42b will not be prevented because the springs 68a and 68b will yield and allow the plate members to be moved further to the position shown in FIGURE 5 with the flaps 62a, 64a and 62b, 64b moving in the side notches 54a, 56a and 54b, 56b. Simultaneously the springs 68a and 68b will be tensioned and cause the members 46a and 46b to be pressed outwardly in firm engagement with the centre hole of the next lowest record so as to provide for a safe holding of this record and the remaining part of the stack while the lowest record is released as indicated in dotted lines in FIGURE 5 and from that position allowed to descend to the turntable by gravity.

Due to the inclination of the outwardly facing surfaces 48a and 48b and the action of the springs 68a and 68b the engagement of these members which constitute the secondary supporting members of the centre spindle will as indicated in FIGURE 6 cause an expansion of the member in the centre hole which will transmit a force to the next lowest record which is directed upwardly and depends on the inclination of the surfaces 48a and 48b. This force will result in a slight lifting of the lowest record and thereby of the remaining stack of the records such as indicated in FIGURE 6 which illustrates the mode of operation in the case of a record having a thickness corresponding substantially to the vertical distance between the top side of the plate members 42a and the lower edges 50a, 50b of the members 46a and 46b.

The combination between an inclined exterior surface of the members 46a and 46b and an upwardly directed force resulting from tensioning of the springs 68a and 68b also provides for safe operation of the spindle in the case of thinner records, such as illustrated in FIGURES 7 and 8. FIGURE 7 shows two records of such a thickness that the lower edge 50b of the inclined surface will engage the centre hole of the next lowest record nearly between the top and bottom surface of the next lowest record. Since the centre hole of a record is cylindrical in very few cases only, but usually increases slightly in diameter in the direction of the surface, it will be understood that if the lower edge 50b of the member 46b engages the centre hole of a record only slightly below a plane in the middle between the top and bottom surface of a record, it will always be possible to lift the record from the position shown in FIGURE 7 to the position shown in FIGURE 8 and thereby hold the next lowermost record safely during the drop of the lowest record.

Even in the event that the centre hole of the record should not allow such lifting of the record or the engagement between the members 46a and 46b at the centre hole of the record should take place nearer the top side of the record and thereby prevent the lifting of this record the springs 68a and 68b will yield and thereby prevent damage to the record or to the mechanism as might be the case if a rigid member were moved outwardly. I have found that the combination of inclined surfaces of the secondary supporting members and the resiliency thereof enables safer handling of records within a larger range of thicknesses than possible with a spindle in which the secondary supporting members are in the form of knives designed to enter the interstice between the lowest and the next lowest record. I have also found the inclined surfaces 48a and 48b to be an advantage as they cause a lifting of the next lowest record whereby the lowest record will be slightly isolated from the underside of the lowest record which prevents it from "hanging" and facilitates its gravity drop to the turntable.

The inclination of the inclined surfaces 48a and 48b relatively to the vertical direction is not very critical and I have found that the spindle will work satisfactorily with this inclination being between 5° and 30°. In practice I prefer an inclination of about 15° as a suitable value.

In the foregoing I have described my invention with reference to a loose centre spindle to be inserted in a phonograph turntable bushing interchangeable with a thin centre spindle.

It will be appreciated, however, that my invention also is applicable to a so called adaptor to be placed on and receiving a fixed thin centre spindle for utilizing the existing record changing mechanism thereof to operate the phonograph with records having oversize centre holes.

A modification of this kind is shown with reference to FIGURES 9 and 10 in which parts corresponding to those already described with reference to FIGURES 1–5 are referred to by the same reference numerals.

In FIGURE 10, reference numeral 102 designates the top portion of a small size centre spindle which has a longitudinal slot in which a slidable latch member 104 is movably supported. The lower portion 106 of the spindle is offset relatively to the top portion 102 and provides an upwardly extending shoulder or platform 108 for receiving a stack of records centered on the top portion 102. The lower end of the spindle includes within itself a drop control member 110 mounted for rocking movement and operable to engage in the centre hole of the lowest record supported on the platform 108 to displace that record sidewardly until its centre hole is in alignment with the lower end 106 of the spindle whereby the record drops to the turntable by gravity.

The lower end of the latch member 104 prevents sideward displacement of the next lowest record of the stack. Such centre spindles and the mechanism for controlling their operation are commonly known and in wide-spread use as well as described in the patent literature and accordingly neither the structure of such centre spindles nor their mode of operation will be described in any further detail in the present specification.

As shown in FIGURES 9 and 10 the base plate generally designated by reference numeral 14 is provided with an elongated slot 112 which communicates with a downwardly extending tubular member 114 having an interior cross section corresponding to the form of the slot 112 dimensioned so as to allow both centre spindle portions 102 and 106 to pass through the tube 114 so as to be received therein. An upwardly extending tubular member 116 is affixed to the base plate relatively to the centre of the base plate 14 which coincides with the axis of the lower spindle portion 106 for receiving the top portion 102 of the thin spindle. At the lower end of the tubular member 116 a slot 118 is provided extending in the direction of the shoulder 108 of the spindle 102, 106 when the latter is received in the adaptor so as to provide passage for the tiltable or rocking drop control lever 110.

As according to the embodiments described in the foregoing with reference to FIGURES 1–5, I provide, for handling the records having large centre holes, a structure including two slidable members 38 and 40 mounted for reciprocation in opposite direction.

The member 38 is composed of a plate formed portion *42a* defining adjacent one end *44a* an upwardly facing record supporting surface. At the other end the member 38 has adjacent the end of a top portion *60a* of the plate shaped member *42a* a secondary supporting member *46a* having an inclined upwardly facing surface *48a*. The secondary supporting member *46a* thereby forms together with the plate member a unitary structure capable of reciprocating in the hole of the oversize spindle structure as a unity. The two structures 38 and 40 are complementary overlying each other in a manner as described hereinbefore.

The structure shown in FIGURES 9 and 10 differs however, from the structure described with reference to FIGURES 1–5 by not being completely symmetric above a line through the centre of the spindle structure perpendicular to the longitudinal direction of the two structures 38 and 40. As shown clearly in FIGURE 9 the lower plate portion *42b* of the structure 40 has a length extending beyond the elongated aperture 112 and is provided with an elongated slot 120 for receiving the tubular member 116 and allowing reciprocation of the member *42b*. As to the structure 38 the plate formed portion *42a* thereof is correspondingly shorter and the overlying portion *60a* thereof is correspondingly larger having a similar elongated slot 122 for receiving the tubular member 116.

A relatively narrow slot 124 extends from the left hand end of the slot 120 and a similar narrow slot 126 extends from the left hand end of the slot 122.

Furthermore means are provided for interlinking the two structures 38 and 40 for concurrent reciprocation in the form of a lever 128 swingingly mounted on a post 130 secured to and extending upwardly from the base 14 through the narrow slots 124 and 126. At one end of the lever 128 a downwardly extending pin 132 is provided engaging in a slot 134 extending inwardly from the front side edge of the plate member *42b*, and at the other end of the lever 128 an upwardly extending pin 136 is provided engaging in a slot 138 extending inwardly from the rear side edge of the plate member *60a*.

It will be understood that when the parts shown in the exploded view of FIGURE 9 are assembled, the lever 128 will interlink the two structures for concurrent reciprocation so that when one of the two structures is caused to move, the lever 128 will turn about the post 130 and thereby cause the other structure to reciprocate concurrently therewith.

In the embodiment of FIGURES 9 and 10 the concurrent reciprocation of the two structures is controlled by the swinging movement of the drop control lever 110. When the control mechanism of the phonograph causes the drop control member 110 to swing in a manner which will result in sideward displacement of a record having small size centre hole supported on the upwardly facing shoulder 108 of the thin spindle, the drop control lever will engage with an abutment 140 (FIGURE 9) disposed adjacent the right hand end of the elongated slot 120 and thereby cause the structure 40 to be reciprocated in the right hand direction. The interlinking connection thereby causes the structure 38 to be reciprocated in the other direction whereby the plate members *42a* and *42b* are retracted to provide gravity release of the records supported on the top sides of these plate shaped portions and concurrently therewith the reciprocation of the two structures causes the inclined outwardly facing surfaces *48a* and *48b* to engage with the centre hole of the next lowest record, if any, of a stack supported on the oversize centre spindle structure or adaptor.

As also described hereinbefore such engagement will prevent further outward movement of the secondary supporting members. This will cause during the further reciprocation of the primary supporting plate members a relative reciprocation between the primary and the secondary supporting members whereby the springs *68a* and *68b* are tensioned so as to cause an expansion effect of the secondary supporting members in the centre hole of said next lowermost record which again will cause that record to slide upwardly along the inclined surfaces *48a* and *48b*.

Though in the foregoing I have described my invention in detail with reference to two different embodiments, it will be understood that my invention is not limited to the embodiments shown and described and that various modifications will be possible within the scope of the invention as defined in the appended claims.

I claim:

1. In record supporting and releasing means: a body operable to center a stack of records having oversize center holes, a pair of plate members having upwardly facing surfaces at substantially the same level, means supporting said plate members for reciprocation within said body between a position having one end of each member projecting outside the confines of said body to provide a record support and a position having said one end retracted to within the confines of said body to provide record release, each of said plate members having adjacent the other end, opposite that movable to project outside said body, a portion overlying the other member and spaced from the top side thereof, a secondary supporting member adjacent each end of said plate members supported on the top side of the projectable end of a respective member, means connecting each of said secondary supporting members with the overlying end portion of a respective plate member, means enabling relative movement between said secondary supporting members and said plate members, each of said secondary supporting members having an inclined outwardly facing surface extending vertically from a predetermined plane above the top surface of each of said plate members, and means operable to be tensioned in response to relative movement between said secondary supporting members and said plate members in response to engagement between said inclined surfaces of said secondary supporting members and the center hole of a record overlying a record supported on said oversides of said plate members.

2. In record supporting and releasing means: a body operable to center a stack of records having oversize center holes, a pair of plate members having upwardly facing surfaces at substantially the same level, means supporting said plate members for reciprocation within said body between a position having one end of each member projecting outside the confines of said body and a position having said end retracted to within the confines of said body, each of said plate members having adjacent the end opposite that movable to project outside said body, a portion overlying the other member and spaced from the top side thereof, abutments on said overlying plate portions, a secondary supporting member having an abutment surface and located adjacent each end of said plate members supported on the top side of the projectable end of one member, spring means holding the abutments on said overlying plate portions in engagement with said abutment surfaces of said secondary supporting members, each of said secondary supporting members having an inclined upwardly facing surface extending vertically from a predetermined plane above the top surface of each of said plate members, and means operable to reciprocate said plate members in opposite direction to cause retraction of said plate members to within the confines of said body and concurrently projection of said secondary supporting members.

3. In record supporting and releasing means: a body operable to center a stack of records having oversize center holes, a pair of elongated plate members having upwardly facing surfaces at opposite ends at substantially the same level to provide a record support and at their other ends portions overlying said surfaces vertically spaced therefrom, means supporting said plate members for reciprocation within said body between a position having said opposite ends projecting outside the confines, of said body and a position having said opposite ends retracted to within the confines of said body, a pair of secondary supporting members, means operable to connect each of said secondary supporting members and a corresponding one of said plate members to define therewith a unitary structure, means operable to position each of said secondary members relatively to said plate members to provide a length of said structures which is slightly longer than the diameter of said body, means enabling reciprocation of each of said secondary supporting members relatively to a respective plate member, each of said secondary supporting members having an inclined outwardly facing surface extending vertically from a predetermined plane above the top surface of each of said plate members, and means operable to be tensioned in response to reciprocation of said secondary supporting members relatively to said plate members in response to engagement between said inclined surfaces of said secondary supporting members and the center hole of a record overlying a record supported on said oversides of said plate members.

4. In a record supporting and releasing means: a body of substantially circular cross-section operable to center a stack of records having oversize center holes, a pair of elongated members having portions overlying each other and having exterior end portions defining upwardly facing surfaces at substantially the same level, means supporting said elongated members for reciprocation within said body between an operative record supporting position having said end portions projecting outside the confines of said body and a record release position having said end portions retracted to within the confines of said body, means operable to cause such reciprocation, a secondary supporting member adjacent each overlying portion of said elongated members supported and on the top sides of the projectable ends thereof, means connecting each of said secondary supporting members with a respective one of said overlying portions of said elongated members to participate in the reciprocation thereof, means enabling each of said secondary supporting members to reciprocate relatively to a corresponding elongated member, each of said secondary supporting members having an inclined outwardly facing surface extending vertically from a predetermined plane above the upwardly facing surface of each of said elongated members, and means operable to be tensioned in response to reciprocation of said secondary supporting members relatively to said elongated members in response to engagement between said inclined surfaces of said secondary supporting members and the center hole of a record overlying a record supported on said upwardly facing surfaces of said elongated members.

5. In record supporting and releasing means for records having oversize center holes: a large size body having substantially cylindrical confines operable to center a stack of such records, a small size spindle structure having support means operable to support and release in sequence records having center holes of relatively small diameters including within itself a drop control member movable to cause release of the lowest record of a stack supported on said support means, means for receiving and positioning said small size spindle structure within said large size body, a pair of elongated structures each including a lower supporting member at one end and an upper supporting member at the opposite end, said structures overlying each other at opposite ends with said lower supporting members in one plane and said upper supporting members vertically spaced therefrom, means for supporting said structures for reciprocation within said body, said lower supporting members being provided with upwardly facing record supporting surfaces and said upper supporting members being provided with inclined upwardly facing surfaces having a vertical extent greater than the thickness of a record, means interlinking said upper and said lower supporting members for mutual reciprocation, means interlinking said structures for concurrent reciprocation to retract said lower supporting surfaces to a record release position substantially within the confines of said large size body and project said inclined surfaces of said upper supporting members to engage with the center hole of a record overlying a record supported on said lower supporting members, spring means operable to be tensioned in response to such engagement, and means operable to engage said drop control member of said thin spindle with one of said structures.

6. In a record supporting and releasing means for records having oversize center holes, a body operable to center a stack of such records, a spindle structure operable to support and release in sequence records having center holes of relatively small diameters including an upwardly facing shoulder and a drop control member movable to displace the lowest record of a stack supported on said shoulder, means for receiving and positioning said spindle structure within said body, a transverse guide extending through said body, a pair of lower supporting members and a pair of upper supporting members mounted for reciprocation in said transverse guide within said body, said lower supporting members being provided with upwardly facing record supporting surfaces and said upper supporting members with inclined outwardly facing surfaces, said inclined outwardly facing surfaces being of such length and inclination that the component thereof in the axial direction of the center hole of a record is larger than the thickness of the record in said axial direction, means operatively connecting said upper and said lower supporting members to provide a pair of structures, means interlinking said structures for concurrent reciprocation in opposite direction to retract said lower supporting surfaces to a record release position substantially within the confines of said body and project said inclined surfaces of said upper supporting members to engage with the center hole of a record overlying a record supported on said lower supporting members, spring means operable to be tensioned in response to such engagement, and means operable to control reciprocation of one of said structures in response to such movement of said drop control member of said thin spindle which will result in sideward displacement of a record supported on said upwardly facing shoulder of said thin spindle.

7. In record supporting and releasing means for records having oversize center holes: a body operable to center a stack of such records, a spindle structure operable to support and release in sequence records having center holes of relatively small diameters including an upwardly facing shoulder and a drop control member movable to displace the lowest record of a stack supported on said shoulder, means for receiving and positioning said spindle structure within said body, a pair of lower supporting members and a pair of upper supporting members, means for movably supporting said lower and said upper supporting members within said body, said lower supporting members being provided with upwardly facing record supporting surfaces and said upper supporting members with inclined outwardly facing surfaces, said inclined outwardly facing surfaces being of such length and inclination that the component thereof in the axial direction of the center hole of the record is larger than the thickness of the record in said axial direction, means interlinking said upper and said lower supporting surfaces for concurrent operation to retract said lower supporting surfaces to a record release position substantially within the confines of said body and project said inclined surfaces of said upper supporting members to engage with the center hole of a record overlying a record supported on said lower supporting members, spring means operable to be tensioned in response to such engagement, and means operable to control such concurrent operation of said lower and said upper supports in response to such movement of said drop control member of said thin spindle which will result in sideward displacement of a record supported on said upwardly facing shoulder of said thin spindle.

8. In a record supporting and releasing means for records having oversize center holes in combination: a body for centering a stack of records, primary supporting members having upwardly facing surfaces, means operable to reciprocate said primary members in a direction substantially perpendicular to the axis of the center holes between a record supporting position outside said body and a record releasing position substantially within the confines of said body, secondary supporting members having sloping outwardly and upwardly facing surfaces for engaging with the center hole of said next lowermost record of said stack, means operable to control the reciprocating movement of said secondary supporting members in a direction opposite to the direction of a respective one of said primary supporting members, and means operable to be tensioned in response to engagement between said surfaces of said secondary supporting members and the center hole of a record.

9. In a center spindle structure for supporting and sequentially releasing records having oversize center holes in combination: a body having an essentially cylindrical cross-section, a pair of elongated horizontal structures arranged within said body, a guide channel extending transversely through said body and providing a mounting for said two structures to permit movement thereof transversely of said body, each said structure being slightly longer than the diameter of said body whereby one end of each structure protrudes outwardly therefrom when the other end remains inwardly thereof, means connecting said elongated structures for opposite concurrent movement to compel the end of the lower part of each structure to protrude beyond the confines of said body when the upper end of said structure is retracted and vice-versa, said two structures each including at one end thereof slide plates having end edges in substantially the same horizontal plane and at the other end thereof members having an inclined outwardly and upwardly facing end surface in a plane above said plate members, means holding the slide plate and the member of each structure in mutual relative position with said end edge of said slide plate and said inclined end surface of said member spaced from each other more than the diameter of said spindle body, and resilient means interposed between each of said plate members and each of said members at the other end thereof for enabling relative longitudinal movement between a respective plate member and inclined end member.

10. In a center spindle structure for supporting and sequentially releasing records having oversize center holes in combination: a body having an essentially cylindrical cross-section, a pair of elongated horizontal structures arranged within said body and each including a lower part and an upper part, means providing a mounting for said two structures to permit movement thereof transversely of said body, each structure being slightly longer than the diameter of said body whereby one end of each structure is advanced outwardly therefrom when the other end remains inwardly thereof, means connecting said elongated structures for opposite concurrent movements to compel one end of the lower part of one structure to protrude beyond the confines of said body when the upper end of said structure is similarly retracted and vice-versa, said two structures each including at one end thereof slide plates in substantially the same horizontal plane and at the other end thereof members having an inclined outwardly and upwardly facing surface in a plane above said plate members, and resilient means interposed between a respective one of said plate members and said members at the other end thereof for enabling relative longitudinal movement between said plate members and said inclined end members, and positioning means between said plate members and said inclined members.

11. For use with a phonograph having a turntable, a centre spindle structure for supporting and releasing records having oversize center holes to permit gravity release of the lowest record of a stack of such records in combination: a spindle body of circular cross-section, a pair of lower supporting plate members each having an upwardly facing record supporting surface and arranged to project said upwardly facing surfaces outside said spindle body in a plane perpendicular to the axis of said spindle structure, means operable to support said lower supports for movement in said plane, resilient means operable to hold said lower supporting members in said projecting position, a control member movable within said spindle body, means for moving said plate members against the action of said resilient means in response to movement of said control member to assume a record releasing position retraced within the confines of said spindle body, a pair of upper supporting members each having an inclined outwardly facing arcuate surface extending upwardly from a plane perpendicular to the axis of said spindle body vertically spaced from said upwardly facing record supporting surfaces of said plate members, resilient means interposed between said upper supporting members and said lower supporting members operable to move said upper supporting members outwardly concurrently with inward movement of said plate members to cause engagement between said inclined surfaces of said upper supporting members and the center hole of a record overlying a record supported on said lower supporting members, whereby said upper supporting members are prevented from further outward movement and will engage with said center hole of said record under influence of said resilient means while said lower supporting members are further retracted to release said record supported thereon.

12. For use with a phonograph having a turntable, a center spindle structure for supporting and releasing records having oversize center holes to permit gravity release of the lowest record of a stack of such records in combination: a spindle body of circular cross-section, a pair of lower supporting members each having an upwardly facing record supporting surface and arranged at opposite sides of said body with said upwardly facing surfaces in a plane perpendicular to the axis of said spindle structure, means operable to guide said lower supports for movement in said plane, means operable to hold said lower supporting members in a projecting record supporting position with said upwardly facing surfaces projecting outside the confines of said spindle body, a control member movable within said spindle body, means for moving said lower supporting members in response to movement of said interior control member to assume a record releasing retracted position with said record supporting surfaces retracted within the confines of said spindle body for allowing a record supported on said record supporting surfaces to be released and by gravity to descend along said spindle to said turntable, a pair of upper supporting members each having an outwardly facing arcuate surface extending upwardly from a plane perpendicular to the axis of said spindle body vertically spaced from said upwardly facing record supporting surfaces of said lower supporting members a distance substantially corresponding to the maximum thickness of a record to be released, each of said outwardly facing arcuate surfaces further sloping inwardly from said lower edges thereof, resilient means interposed between said upper supporting members and said lower supporting members operable to move said upper supporting members outwardly, at least one abutment means on each of said lower supporting members engaging with at least one surface of each of said upper supporting members for limiting said outward movement of said upper supporting members to a position of said upper supporting members substantially within the confines of said spindle body member when said lower supporting members are in their projecting record supporting position, said abutment means on said lower supporting members being operative to enable outward movement of said upper supporting members with said surfaces thereof in engagement with said abutment means of said lower supporting members during retraction of said lower supporting members until said sloping outwardly facing surfaces enter into engagement with the center hole of a record resting on the top surface of said record supported on said lower supporting members, whereby said upper supporting members are prevented from further outward movement and will engage resiliently with said center hole of said record under influence of said resilient means while said lower supporting members are further retracted to release said record supported thereon during their movement by disengaging said abutment means on said upper supporting members from said surfaces of said upper supporting members.

13. For use with a phonograph having a turntable for supporting and releasing records having oversize center holes and permit gravity release of the lowest record of a stack of such records: a spindle structure having a body, a transverse guide channel extending through said body, a pair of complementary structures mounted for reciprocation in said channel, each complementary structure having at one end a plate member having an end edge and at the other end a secondary member having an inclined outwardly facing surface at a predetermined vertical distance above said plate member, abutments operable to limit relative movement of a respective plate member and corresponding secondary member to confine the length of each of said structures to be slightly longer than the diameter of said spindle body, resilient means operable to hold said abutments in operative engagement and operable to yield to decrease the length of each of said structures, means operable to hold said structures in position with said plate members extending outside the confine of said spindle to provide primary supports for a record, and means operable to control concurrent movement of said structures in opposite direction to retract said plate members to within the confines of said spindle to allow gravity release of a record supported on said plate members and project said secondary members outside the confines of said spindle to engage said inclined surfaces against the center hole of a record overlying said record supported on said plate members.

14. For use with a phonograph having a turntable for supporting and releasing records having oversize center holes and permit gravity release of the lowest record of a stack of such records: a spindle structure having a body, a transverse guide channel extending through said body, a pair of complementary structures mounted for reciprocation in said channel each having at one end a plate member and at the other end a member having an inclined outwardly facing surface at a predetermined vertical distance above said plate member, means holding a respective plate member and corresponding member having said inclined surface in mutual position so that the length of each of said structures is slightly longer than the diameter of said spindle body, means operable to hold said structures in positions with said plate members extending outside the confine of said spindle to provide primary supports for a record, means operable to control concurrent movement of said structures in opposite direction to retract said plate members to within the confines of said spindle to allow gravity release of a record supported on said plate members and project said members having said inclined surfaces outside the confines of said spindle to engage said inclined surfaces against the center hole of a record overlying said record supported on said plate members, and means capable of yielding when said inclined surfaces engage the center hole of a record.

15. For use with a phonograph having a turntable for supporting and releasing records having oversize center holes and permit gravity release of the lowest record of a stack of such records: a spindle structure of circular cross section having a pair of lower supporting plates provided with upwardly facing record supporting surfaces extending in opposite direction of said spindle and each being mounted for reciprocation in a plane transverse to the axis of the spindle between a projecting record supporting position of said record supporting surfaces and a retracted position of said surfaces within the confines of the spindle, and a pair of upper supporting members each being arranged substantially above said upwardly facing surfaces of said lower supports and provided with an inclined outwardly and upwardly facing surface for engaging with the center hole of a record, means connecting each of said upper supporting members with that of said lower supporting members which has its supporting surface extending towards the opposite side of the spindle, means operable to control simultaneous reciprocation of both said pairs of supporting members from a projecting record supporting position of said lower supports to a position within the confines of the spindle simultaneously with reciprocation of said upper supporting members from their retracted position to an operative position engaging said inclined surfaces with the next lowermost record in the stack, and resilient means included in the connection between said lower supporting members and said upper supporting members capable of yielding when said inclined surfaces of said upper supporting member engage the center hole of a record.

16. For use with a phonograph having a turntable for supporting and releasing records having oversize center holes and permit gravity release of the lowest record of a stack of such records: an elongated spindle structure including a body of substantially circular cross-section and having a pair of lower supporting plates provided with upwardly facing record supporting surfaces, each of said lower supporting plates being mounted for movement in a plane transverse to the axis of the spindle between a projecting record supporting position of said record supporting surfaces on opposite sides of said spindle body and a retracted position of said surfaces within the confines of the spindle, and a pair of upper supporting members each being in the form of a body having an inclined outwardly and upwardly facing surface on opposite sides of said spindle body for engaging with the center hole of a record and being mounted for movement in a plane transverse to the axis of the spindle between a projecting operative position and a retracted inoperative position, means operatively connecting each of said upper supporting members on one side of said spindle body with the lower supporting members on the other side of said spindle body to define a unitary structure of a length slightly longer than the diameter of said spindle body, means operable to control simultaneous movement of both said structures in opposite direction from a projecting record supporting position of said supporting plates to a position within the confines of the spindle simultaneously with a movement of said upper supporting members from their retracted position to engage said inclined surfaces with the next lowermost record in the stack, and resilient means in the connection between said lower supporting members and said plate members capable of yielding when said inclined surfaces of said upper support engage the center hole of a record.

17. For use with a phonograph having a turntable for supporting and releasing records having oversize center holes and permit gravity release of the lowest record of a stack of such records: a spindle structure comprising a lower support having upwardly facing record supporting surfaces and being mounted for reciprocating movement in a plane substantially perpendicular to the axis of the spindle between a projecting record supporting position of said record supporting surfaces and a retracted position of said surfaces within the confines of the spindle, and an upper support having inclined outwardly and upwardly facing surfaces for engaging with the interior surface of the center hole of a record and being mounted for reciprocating movement in a plane substantially perpendicular to the axis of the spindle, means operable to control alternative movement of said lower support from its projecting record supporting position to its position within the confines of the spindle simultaneously with movement of said upper support from its retracted position to assume a projecting position engaging said inclined surfaces with the next lowermost record in the stack, and resilient means capable of yielding when said inclined surfaces of said upper support engages the center hole of a record.

18. A phonograph having a record supporting and releasing member for supporting a stack of records with oversize center holes and permit gravity release of the lowest record in the stack including a spindle structure having a lower support mounted for reciprocating movement essentially perpendicularly to the axis of the spindle between a projecting record supporting position and a retracted position within the confines of the spindle and an upper support mounted for reciprocating movement essentially perpendicularly to the axis of the spindle to move alternately with the lower support from a retracted position within the confines of the spindle, and when the lower support is retracted to assume a projecting position engaging the next lowermost record in the stack, means operable to control simultaneous movement of the lower and upper supports, and resilient means capable of yielding when the upper support engages the centre hole of a record.

19. A record supporting and releasing spindle structure for records having oversize center holes including primary supporting members having upwardly facing record supporting surfaces and secondary supporting members having inclined outwardly facing surfaces, means operable to reciprocate said primary supporting members and said secondary supporting members in opposite directions within planes substantially perpendicular to the axis of the spindle structure to retract the primary supporting members to within the confines of the spindle structure for releasing the lowest record of a stack and simultaneously project said secondary supporting members to engage the center hole of the next lowermost record, if any, of said stack with said inclined outwardly facing surfaces, and means able to yield in response to said engagement.

20. A record supporting and releasing spindle structure for records having oversize center holes including primary and secondary supporting member reciprocable alternately in opposite directions within planes substantially perpendicular to the axis of the spindle structure to retract the primary supporting members to within the confines of the spindle structure for releasing the lowest record of a stack and simultaneously supporting the next lowermost record and remaining records, if any, of said stack by the secondary supporting members, in which the secondary supporting members are provided with sloping outwardly and upwardly facing surfaces for engaging with the center hole of said next lowermost record and are able to yield in response to said engagement.

References Cited in the file of this patent

UNITED STATES PATENTS

| | | |
|---|---|---|
| 2,604,325 | Hansen | July 22, 1952 |
| 2,666,647 | Dale | Jan. 19, 1954 |
| 2,706,639 | Sperber | Apr. 19, 1955 |
| 2,893,739 | Maxim | July 7, 1959 |

FOREIGN PATENTS

| | | |
|---|---|---|
| 115,241 | Sweden | Oct. 23, 1945 |
| 147,353 | Sweden | Oct. 19, 1954 |